United States Patent
Jensen

(10) Patent No.: US 7,386,283 B2
(45) Date of Patent: Jun. 10, 2008

(54) TRANSLATIONAL LOOP RF TRANSMITTER ARCHITECTURE FOR GSM RADIO

(75) Inventor: Henrik T. Jensen, Long Beach, CA (US)

(73) Assignee: Broadcom Corporation, Irvine, CA (US)

(*) Notice: Subject to any disclaimer, the term of this patent is extended or adjusted under 35 U.S.C. 154(b) by 217 days.

(21) Appl. No.: 10/676,321

(22) Filed: Sep. 30, 2003

(65) Prior Publication Data

US 2005/0070234 A1    Mar. 31, 2005

(51) Int. Cl.
  *H04B 1/02* (2006.01)
  *H04B 1/04* (2006.01)
(52) U.S. Cl. .................. 455/91; 455/103; 455/118
(58) Field of Classification Search ........ 455/101–104, 455/108–113, 118–119, 126, 127.4, 105, 455/76
See application file for complete search history.

(56) References Cited

U.S. PATENT DOCUMENTS

| | | | | |
|---|---|---|---|---|
| 6,125,266 | A * | 9/2000 | Matero et al. | 455/126 |
| 6,289,056 | B1 * | 9/2001 | Dartois | 375/295 |
| 6,456,950 | B1 * | 9/2002 | El-Ghoroury et al. | 702/75 |
| 6,504,862 | B1 * | 1/2003 | Yang | 375/146 |
| 6,516,184 | B1 * | 2/2003 | Damgaard et al. | 455/86 |
| 6,606,483 | B1 * | 8/2003 | Baker et al. | 455/126 |
| 6,639,509 | B1 * | 10/2003 | Martinez | 340/10.4 |
| 6,845,083 | B2 * | 1/2005 | Mollenkopf et al. | 370/215 |
| 6,928,122 | B2 * | 8/2005 | Opas et al. | 375/296 |
| 6,952,569 | B2 * | 10/2005 | Damgaard et al. | 455/118 |
| 6,961,546 | B1 * | 11/2005 | Rofougaran et al. | 455/118 |
| 6,961,547 | B2 * | 11/2005 | Rozenblit et al. | 455/118 |
| 7,027,780 | B2 * | 4/2006 | Jensen | 455/91 |
| 2002/0163396 | A1 * | 11/2002 | Lim et al. | 331/179 |
| 2003/0060174 | A1 * | 3/2003 | Nguyen et al. | 455/110 |
| 2003/0193923 | A1 * | 10/2003 | Abdelgany et al. | 370/342 |
| 2004/0166816 | A1 * | 8/2004 | Chang et al. | 455/91 |
| 2004/0212445 | A1 * | 10/2004 | Haglan | 332/103 |
| 2005/0152463 | A1 * | 7/2005 | DeChamps et al. | 375/260 |

* cited by examiner

*Primary Examiner*—Simon Nguyen
(74) *Attorney, Agent, or Firm*—Garlick, Harrison & Markison; James A. Harrison

(57) ABSTRACT

Digital signal processing generates IF modulated digital data which is then converted to analog using a high sample rate digital-to-analog converter (DAC) without first producing a baseband signal that is to be upconverted to IF. The digital data has a high sample rate that is a whole multiple of a specified IF signal. A DAC converts the digital data into a continuous waveform IF signal that is produced to a feed-forward filter that eliminates spectral copies of the signal. The sample rate is selected so that harmonic signals do not appear in specified signal bands. Various embodiments include sample rates of 104 and 338 MHz (GSM application). The 26 MHz IF filtered signal produced by the feed-forward filter is then produced to a translational loop that produces a corresponding output oscillation (RF transmit signal).

24 Claims, 12 Drawing Sheets

TRANSLATIONAL LOOP RF TRANSMITTER ARCHITECTURE FOR GSM RADIO

BACKGROUND

1. Technical Field

The present invention relates to wireless communications and, more particularly, wideband wireless communication systems.

2. Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards, including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, etc., communicates directly or indirectly with other wireless communication devices. For direct communications (also known as point-to-point communications), the participating wireless communication devices tune their receivers and transmitters to the same channel or channels e.g., one of a plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via a public switch telephone network (PSTN), via the Internet, and/or via some other wide area network.

Each wireless communication device includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with the particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, and a data recovery stage (de-modulator). The low noise amplifier receives an inbound RF signal via the antenna and amplifies it. The one or more intermediate frequency stages mix the amplified RF signal with one or more local oscillations to convert the amplified RF signal into a baseband signal or an intermediate frequency (IF) signal. As used herein, the term "low IF" refers to both baseband and intermediate frequency signals. A filtering stage filters the low IF signals to attenuate unwanted out of band signals to produce a filtered signal. The data recovery stage recovers raw data from the filtered signal in accordance with the particular wireless communication standard. Alternate designs being pursued at this time further include direct conversion radios that produce a direct frequency conversion often in a plurality of mixing steps or stages.

Phase locked loops (PLLs) are becoming increasingly popular in integrated wireless transceivers as components for frequency generation and modulation. PLLs are typically used for one of a variety of functions, including frequency translation to up-convert a baseband (BB) frequency to an intermediate frequency (IF) or to one of a BB frequency or IF to RF prior to amplification by a power amplifier and transmission (propagation). PLLs allow for a high degree of integration and, when implemented with the appropriate amount of programmability, can form a main building block for modulators that operate over a wide range of frequencies. Typically, a baseband processor produces a baseband digital data that is converted to a continuous waveform signal by a digital-to-analog converter (DAC). The continuous waveform signal is a BB frequency signal that requires up-converting to IF and then RF.

A class of PLL based transmitters, known as translational loops, have become particularly popular. Briefly, in a translational loop, the desired modulated spectrum is generated as some low IF or baseband signal and then is translated to the desired RF using a PLL. In applications with non-constant envelope modulation, a parallel path for amplitude variation modulates the output power amplifier to generate the desired amplitude variation.

FIG. 1 illustrates a translational loop transmitter in accordance with some current designs for use in a global system for mobile communications (GSM) network. The example shows a so-called "quad" band transmitter, where four transmission bands are supported. Specifically, these bands are located in the 1900 MHz, 1800 MHz, 900 Mhz, and 800 MHz range. Generally, the transmitter of FIG. 1 includes a baseband processor that produces a low frequency digital signal that is converted by a DAC and is low-pass filtered to create a low frequency continuous waveform signal. A translational loop is then used to up-convert the low frequency continuous waveform signal to the desired transmission frequency for transmission from a power amplifier. Because this transmitter is utilized in a GSM network in which the information is conveyed in a phase-modulated carrier, the digital processor of the transmitter of FIG. 1 phase modulates the digital data.

More specifically, the transmitter of FIG. 1 includes a digital baseband processor, in-phase and quadrature digital-to-analog converters (DACs), corresponding low-pass reconstruction filters, and analog baseband mixers. A summing node combines the mixer outputs, which are followed by low-pass filtering. The remaining components of the transmitter are a phase and frequency detector (PFD), a 26 MHz crystal reference, a charge pump, a loop low-pass filter (Loop Filter), a voltage controlled oscillator (VCO), a divide-by-2 module, a pair of offset mixers, as well as corresponding low-pass filters (LPFs). Radio frequency channel selection is achieved by employing a fractional-n (FRAC-N) frequency synthesizer.

A qualitative description of the operation of the translational loop is as follows. The sum of the mixing products of the baseband I & Q components with down-converted RF output I & Q components are low-pass filtered to generate a 26 MHz sinusoid whose excess phase component equals the difference between the desired baseband phase signal and the RF output phase signal. The 26 MHz IF is extracted by the PFD whose output is the phase error signal. As in any other properly designed PLL, the closed loop action of the loop causes the error signal to approach zero; hence, the phase of the RF output tracks the phase of the baseband signal, as desired.

FIG. 2A is a diagram that illustrates a power spectrum density (PSD) measured in decibels relative to the carrier (dBc) versus frequency measured in Mega-Hertz for the digital baseband processor of the radio transmitter of FIG. 1. As indicated, the sample rate of the digital processor for the GSM radio transmitter of FIG. 1 is 13 MHz. FIG. 2B illustrates the modulation error of a GSM translational loop transmitter as a function of baseband DC offset in % relative to full scale signal. FIG. 2C illustrates the modulation error of the example GSM translational loop transmitter as a function of baseband gain mismatch in % relative to full scale signal. Finally, FIG. 2D illustrates the modulation error of the example GSM translational loop transmitter as a function of RF phase imbalance in degrees.

The modulation performance of the translational loop architecture of FIG. 1 often degrades significantly in the presence of baseband DC offset as well as I/Q imbalances on the baseband side and the RF feedback path as may be seen in FIGS. 2A-2D. The negative impact of DC offset is particularly troublesome in low-voltage CMOS processes where it may constitute a significant fraction of the full-scale signal amplitude. In applications where relatively high modulation performance is required, such as in GSM cellular telephony, the modulation error introduced by DC offset and I/Q imbalances may exceed the permissible level even with application of careful analog design and calibration techniques intended to minimize these effects. For GSM cellular telephony, the root-mean-square (RMS) transmitter modulation error performance must be better than 5° and the peak modulation error must be better than 20°. It follows from FIGS. 2A-2D that for the transmitter of FIG. 1, baseband DC offsets should be limited to less-than 1% of the full scale signal, and the gain mismatch should be limited to less-than 3% for the transmitter to satisfy the modulation accuracy requirements. In particular, limiting DC offset to less than 1% of the full-scale signal is impractical or impossible in a low-voltage CMOS process, thus making it difficult to obtain these performance requirements.

Thus, a need exists for a modified translational loop RF transmitter architecture in which DC offset and I/Q imbalances do not pose limitations on transmitter modulation performance.

SUMMARY OF THE INVENTION

Digital signal processing is utilized to eliminate the problems caused by DC offset and I/Q imbalances in the prior art wherein a modulated spectrum at the IF frequency is generated in the digital domain and converted to analog using a high sample rate digital-to-analog converter (DAC) thereby eliminating baseband I/Q imbalance issues. Since the signal is modulated to the IF frequency in the digital domain, any DC offset of the DAC has no impact on the signal band, thereby effectively eliminating the DC offset issues of prior art. In addition, the RF section only employs a single feedback path, as opposed to the in-phase and quadrature paths of the prior art and of other current designs, thereby eliminating RF I/Q imbalance problems.

More specifically, a digital processor produces digital data with a high sample rate that is a whole multiple of a specified IF signal to a DAC. The DAC, a zero$^{th}$ order hold DAC, then converts the digital data into a continuous waveform IF signal characterized by a specified frequency. The DAC output is then produced to a feed-forward filter that eliminates spectral copies of the signal. In one embodiment of the invention, the sample rate is 104 MHz (four times the IF signal frequency of 26 MHz). This choice allows for simplified digital processing in the baseband processor. In another embodiment, however, the sample rate is 338 MHz (thirteen times the IF signal frequency of 26 MHz).

The 26 MHz IF filtered signal produced by the feed-forward filter is then produced to a phase frequency detector (PFD) as a reference signal. The PFD then produces control signals based upon a difference in the reference signal and a feedback signal to a charge pump that, in turn, produces an error current signal to a loop filter. The loop filter then produces an error voltage signal to a voltage controlled oscillator that produces a corresponding output oscillation (RF transmit signal). In order to support quad band operation in a hardware efficient manner, the output oscillation is then divided by two to generate signals in the 800 MHz and 900 MHz bands and then down converted to produce a 26 MHz signal as the feedback signal to the PFD. Because all the transmitter phase information is present in the single phase signal, it is not necessary to have I & Q branches in the translational loop. Thus, the IF signal produced from the high sample rate digital data from the digital processor already includes the phase modulation to carry information in a GSM network without requiring individual I & Q modulation, thereby avoiding I & Q imbalance problems. Further, because the baseband processor produces digital data representing an IF frequency continuous waveform signal, any potential DC offset signals may be easily removed (filtered) to avoid their undesired appearance in subsequent signal processing.

Other aspects of the present invention will become apparent with further reference to the drawings and specification, which follow.

BRIEF DESCRIPTION OF THE DRAWINGS

A better understanding of the present invention can be obtained when the following detailed description of the preferred embodiment is considered with the following drawings, in which.

DETAILED DESCRIPTION OF THE DRAWINGS

Figure 1:
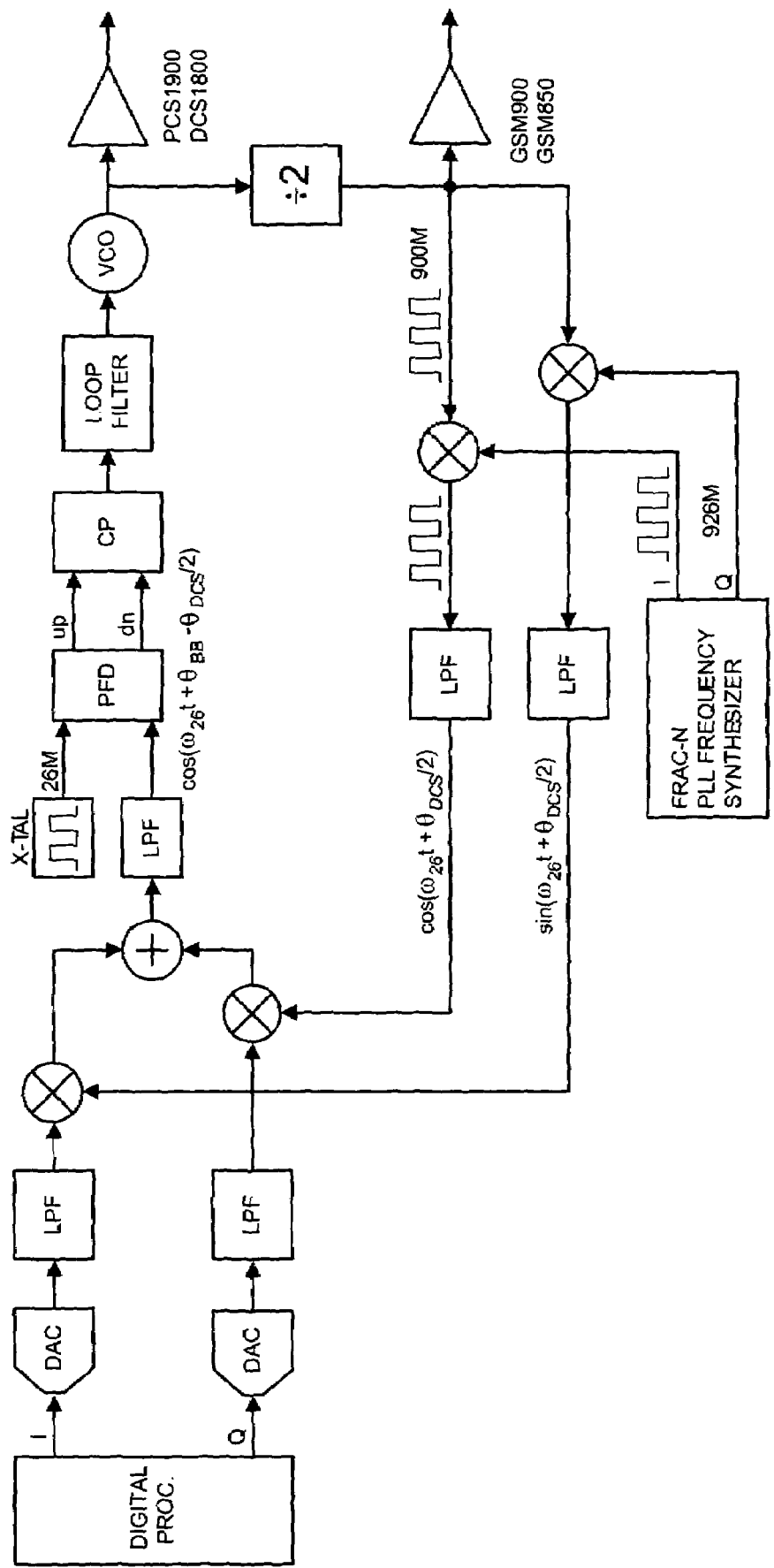
FIG. 1 illustrates a translational loop transmitter in accordance with some current designs that support "quad" band operation for use in a global system for mobile communications (GSM) network.
Figure 2A:
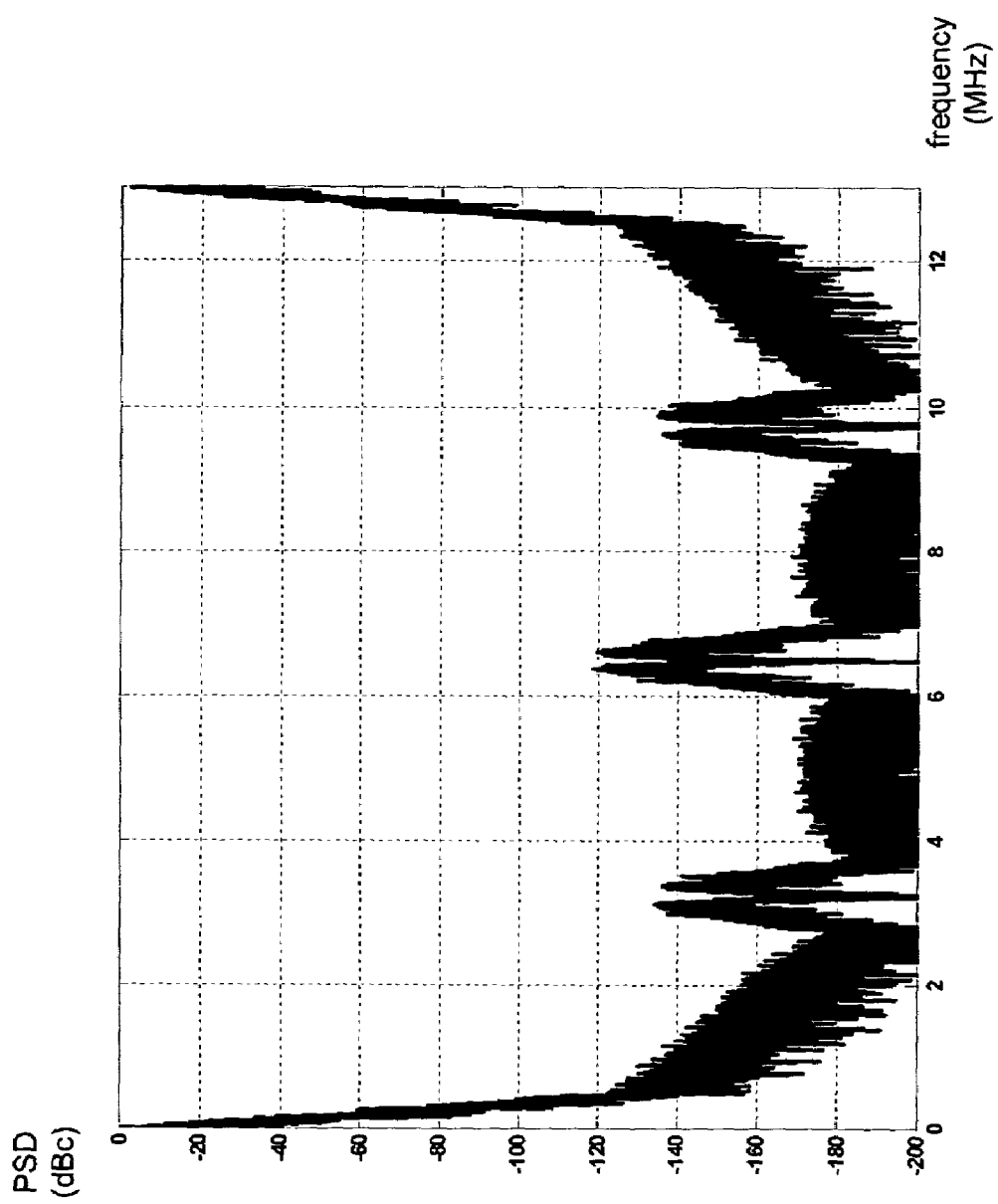
FIG. 2A is a diagram that illustrates a power spectrum density (PSD) measured in decibels relative to the carrier (dBc) versus frequency measured in Mega-Hertz for the digital baseband processor of the radio transmitter of FIG. 1.
Figure 2B:
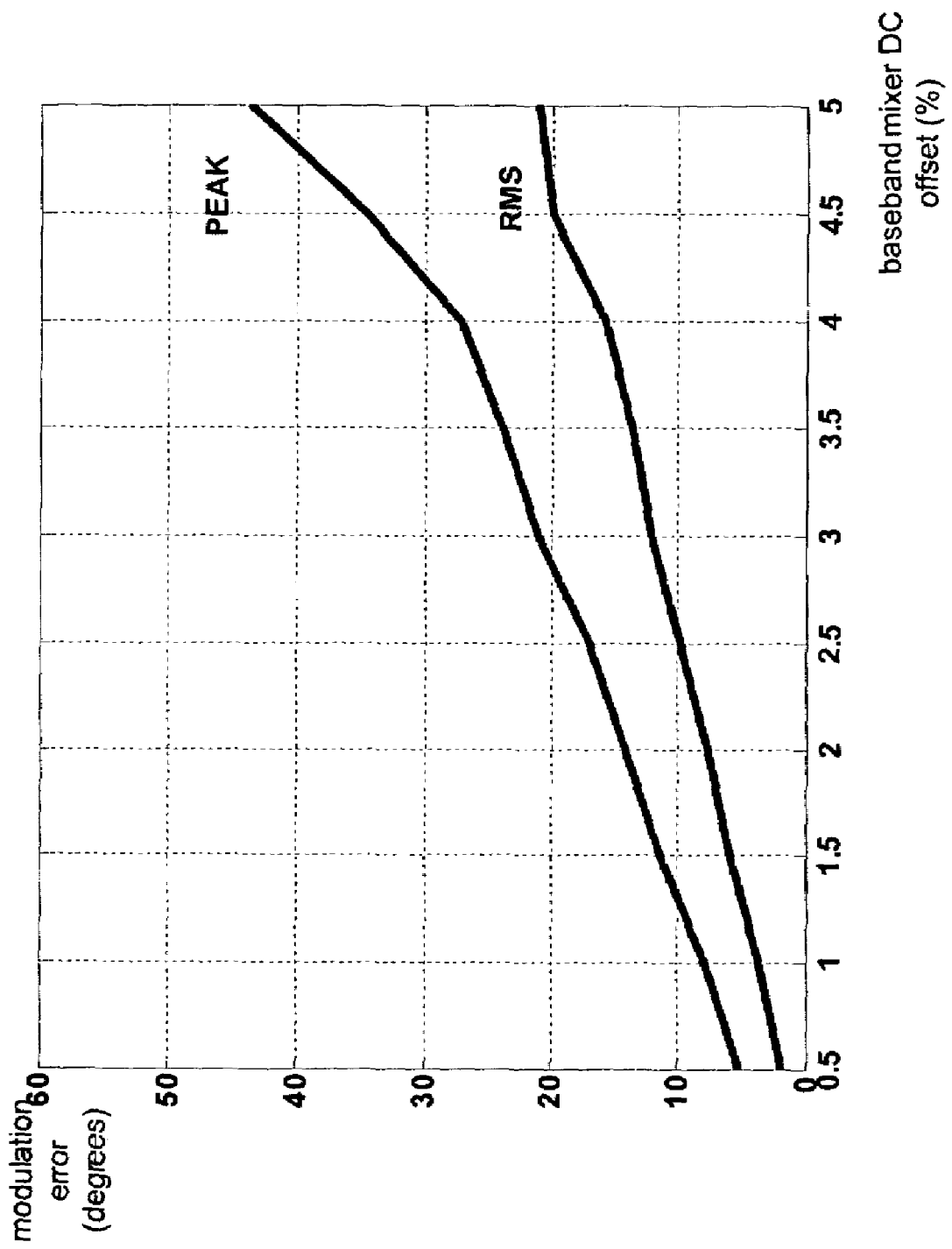
FIG. 2B is a diagram that illustrates modulation error of a GSM translational loop transmitter as a function of baseband DC offset in % relative to full scale signal.
Figure 2C:
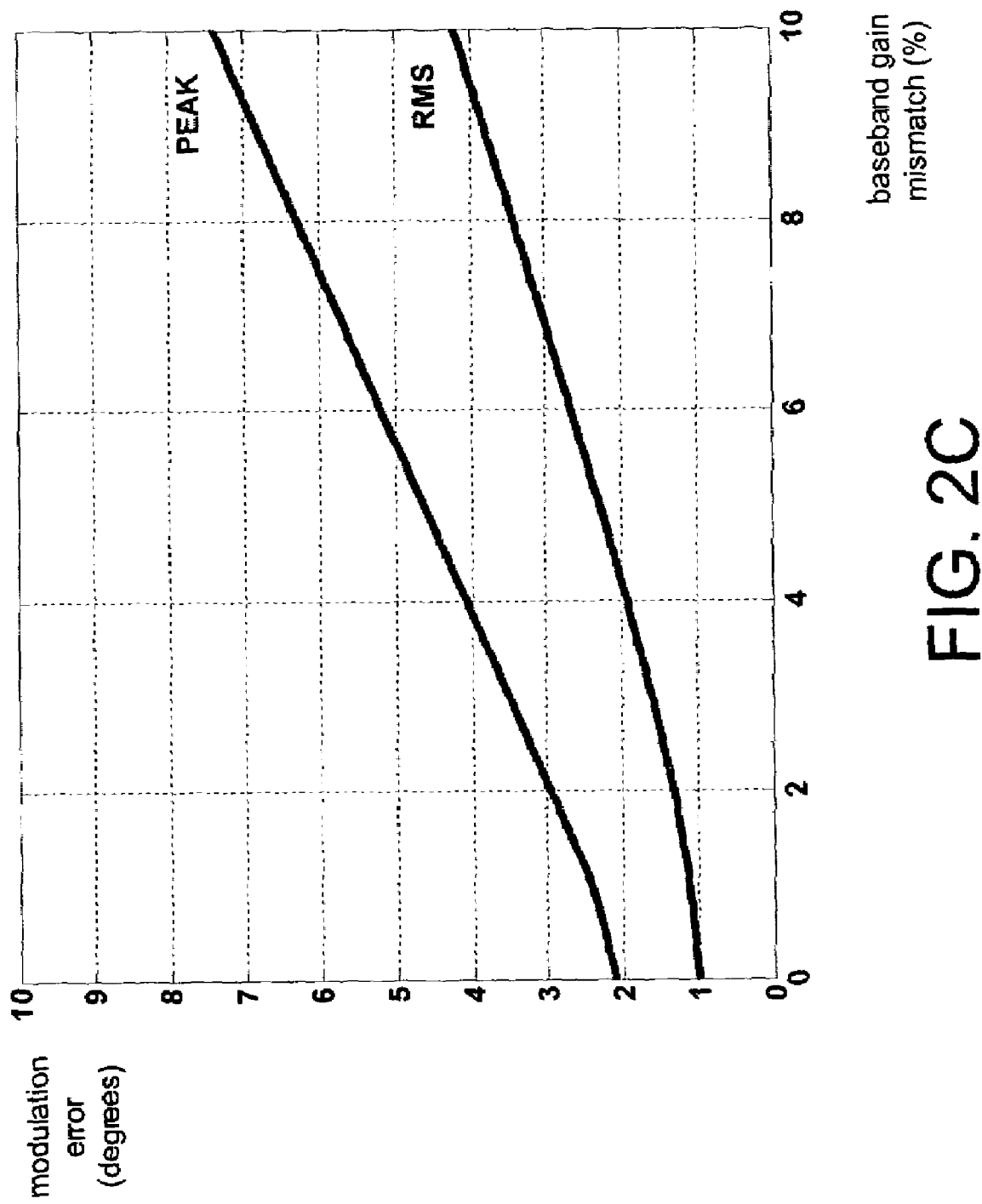
FIG. 2C is a diagram that illustrates modulation error of the example GSM translational loop transmitter as a function of baseband gain mismatch in % relative to full scale signal.
Figure 2D:
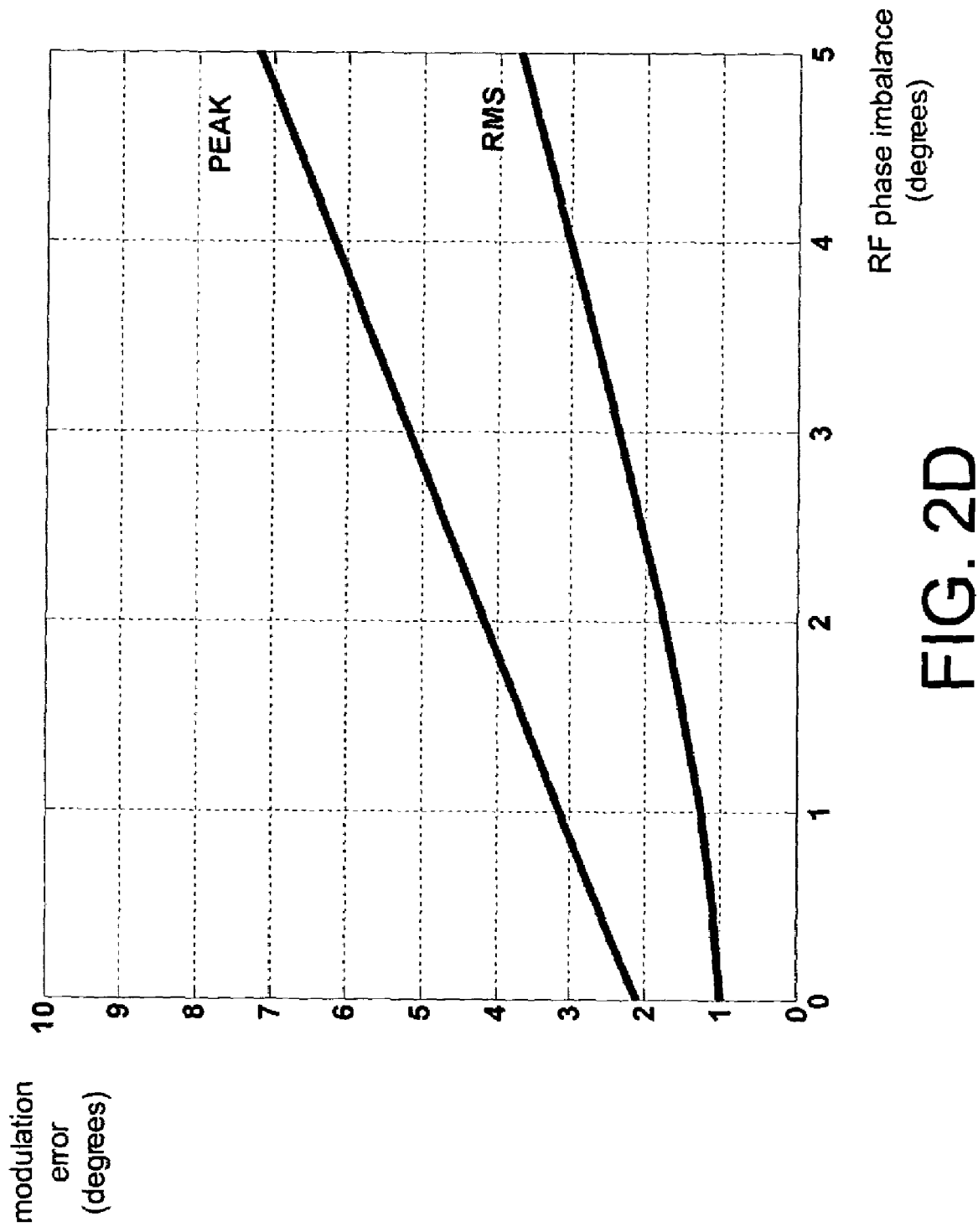
FIG. 2D is a diagram that illustrates modulation error of the example GSM translational loop transmitter as a function of RF phase imbalance in degrees.
Figure 3:
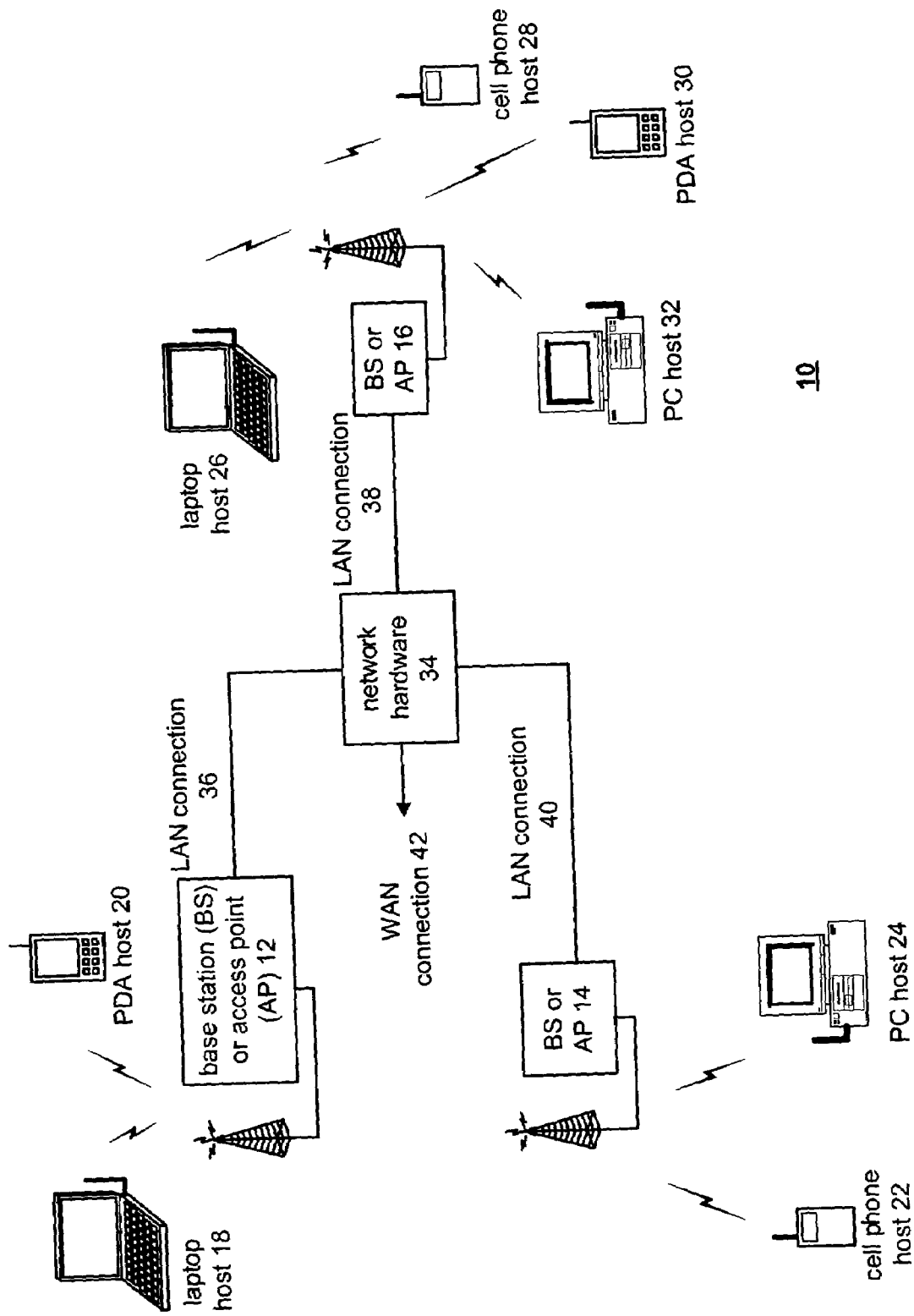
FIG. 3 is a functional block diagram illustrating a communication system that includes a plurality of base stations or access points (APs), a plurality of wireless communication devices and a network hardware component.

FIG. 3 is a functional block diagram illustrating a communication system 10 that includes a plurality of base stations or access points (APs) 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 4.

The base stations or APs 12-16 are operably coupled to the network hardware component 34 via local area network (LAN) connections 36, 38 and 40. The network hardware component 34, which may be a router, switch, bridge, modem, system controller, etc., provides a wide area network connection 42 for the communication system 10. Each of the base stations or access points 12-16 has an associated antenna or antenna array to communicate with the wireless communication devices in its area. Typically, the wireless communication devices 18-32 register with the particular base station or access points 12-16 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio.

Figure 4:
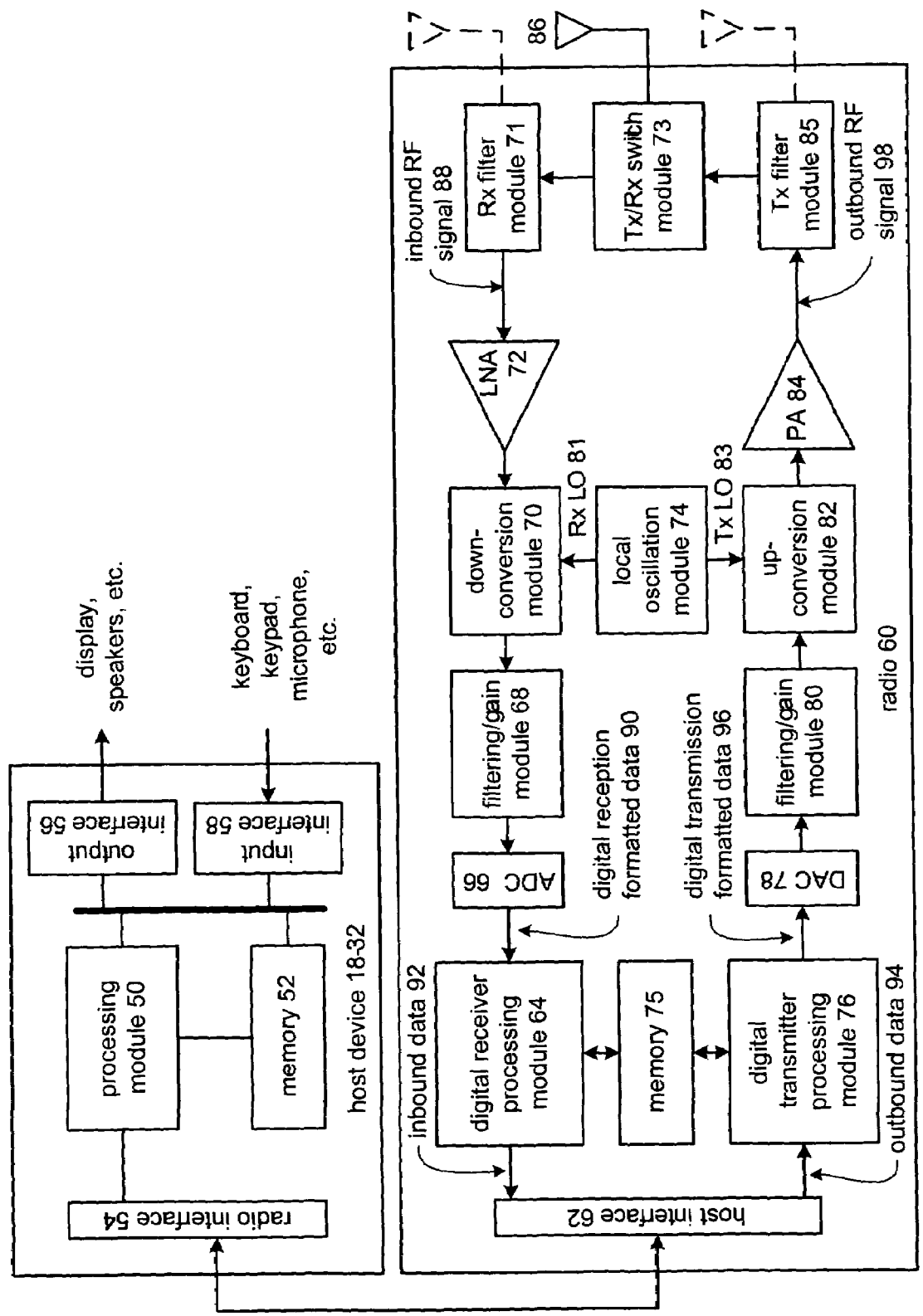
FIG. 4 is a schematic block diagram illustrating a wireless communication device as a host device and an associated radio.

FIG. 4 is a schematic block diagram illustrating a wireless communication device 18-32 as a host device and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host wireless communication device 18-32 includes a processing module 50, a memory 52, a radio interface 54, an input interface 58 and an output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output device such as a display, monitor, speakers, etc., such that the received data may be displayed. The radio interface 54 also provides data from the processing module 50 to the radio 60. The processing module 50 may receive the outbound data from an input device such as a keyboard, keypad, microphone, etc., via the input interface 58 or generate the data itself. For data received via the input interface 58, the processing module 50 may perform a corresponding host function on the data and/or route it to the radio 60 via the radio interface 54.

Radio 60 includes a host interface 62, a digital receiver processing module 64, an analog-to-digital converter 66, a filtering/gain module 68, a down-conversion module 70, a low noise amplifier 72, a receiver filter module 71, a transmitter/receiver (Tx/RX) switch module 73, a local oscillation module 74, a memory 75, a digital transmitter processing module 76, a digital-to-analog converter 78, a filtering/gain module 80, an IF mixing up-conversion module 82, a power amplifier 84, a transmitter filter module 85, and an antenna 86. The antenna 86 is shared by the transmit and receive paths as regulated by the Tx/Rx switch module 73. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, demodulation, constellation demapping, decoding, and/or descrambling. The digital transmitter functions include, but are not limited to, scrambling, encoding, constellation mapping, modulation. The digital receiver and transmitter processing modules 64 and 76, respectively, may be implemented using a shared processing device, individual processing devices, or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the digital receiver processing module 64 and/or the digital transmitter processing module 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. The memory 75 stores, and the digital receiver processing module 64 and/or the digital transmitter processing module 76 executes, operational instructions corresponding to at least some of the functions illustrated herein.

In operation, the radio 60 receives outbound data 94 from the host wireless communication device 18-32 via the host interface 62. The host interface 62 routes the outbound data 94 to the digital transmitter processing module 76, which processes the outbound data 94 in accordance with a particular wireless communication standard (e.g., IEEE 802.11a, IEEE 802.11b, Bluetooth, etc.) to produce digital transmission formatted data 96. The digital transmission formatted data 96 will be a digital baseband signal or a digital low IF signal, where the low IF typically will be in the frequency range of 100 KHz to a few Mega-Hertz.

The digital-to-analog converter 78 converts the digital transmission formatted data 96 from the digital domain to the analog domain. The filtering/gain module 80 filters and/or adjusts the gain of the analog baseband signal prior to providing it to the up-conversion module 82. The up-conversion module 82 directly converts the analog baseband signal, or low IF signal, into an RF signal based on a transmitter local oscillation 83 provided by local oscillation module 74. Local oscillation module 74 is, in one embodiment of the invention, a multi-stage mixer as described herein. The power amplifier 84 amplifies the RF signal to produce an outbound RF signal 98, which is filtered by the transmitter filter module 85. The antenna 86 transmits the outbound RF signal 98 to a targeted device such as a base station, an access point and/or another wireless communication device.

The radio 60 also receives an inbound RF signal 88 via the antenna 86, which was transmitted by a base station, an access point, or another wireless communication device. The antenna 86 provides the inbound RF signal 88 to the receiver filter module 71 via the Tx/Rx switch module 73, where the Rx filter module 71 bandpass filters the inbound RF signal 88. The Rx filter module 71 provides the filtered RF signal to low noise amplifier 72, which amplifies the inbound RF signal 88 to produce an amplified inbound RF signal. The low noise amplifier 72 provides the amplified inbound RF signal to the down-conversion module 70, which directly converts the amplified inbound RF signal into an inbound low IF signal or baseband signal based on a receiver local oscillation signal 81 provided by local oscillation module 74. Local oscillation module 74 is, in one embodiment of the invention, a multi-stage mixer as described herein. The down-conversion module 70 provides the inbound low IF signal or baseband signal to the filtering/gain module 68. The filtering/gain module 68 may be implemented in accordance with the teachings of the present invention to filter and/or attenuate the inbound low IF signal or the inbound baseband signal to produce a filtered inbound signal.

The analog-to-digital converter 66 converts the filtered inbound signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by radio 60. The host interface 62 provides the recaptured inbound data 92 to the host wireless communication device 18-32 via the radio interface 54.

As one of average skill in the art will appreciate, the wireless communication device of FIG. 4 may be implemented using one or more integrated circuits. For example, the host device may be implemented on a first integrated circuit, while the digital receiver processing module 64, the digital transmitter processing module 76 and memory 75 are implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of host device 18-32 and the digital receiver processing module 64 and the digital transmitter processing module 76 of radio 60 may be a common processing device implemented on a single integrated circuit. Further, memory 52 and memory 75 may be implemented on a single integrated circuit and/or on the same integrated circuit as the common processing modules of processing module 50, the digital receiver processing module 64, and the digital transmitter processing module 76. FIG. 4 generally shows the elements of a radio transmitter. In accordance with the present invention, the circuitry shown may be structured as described in greater detail in FIG. 5.

Figure 5:
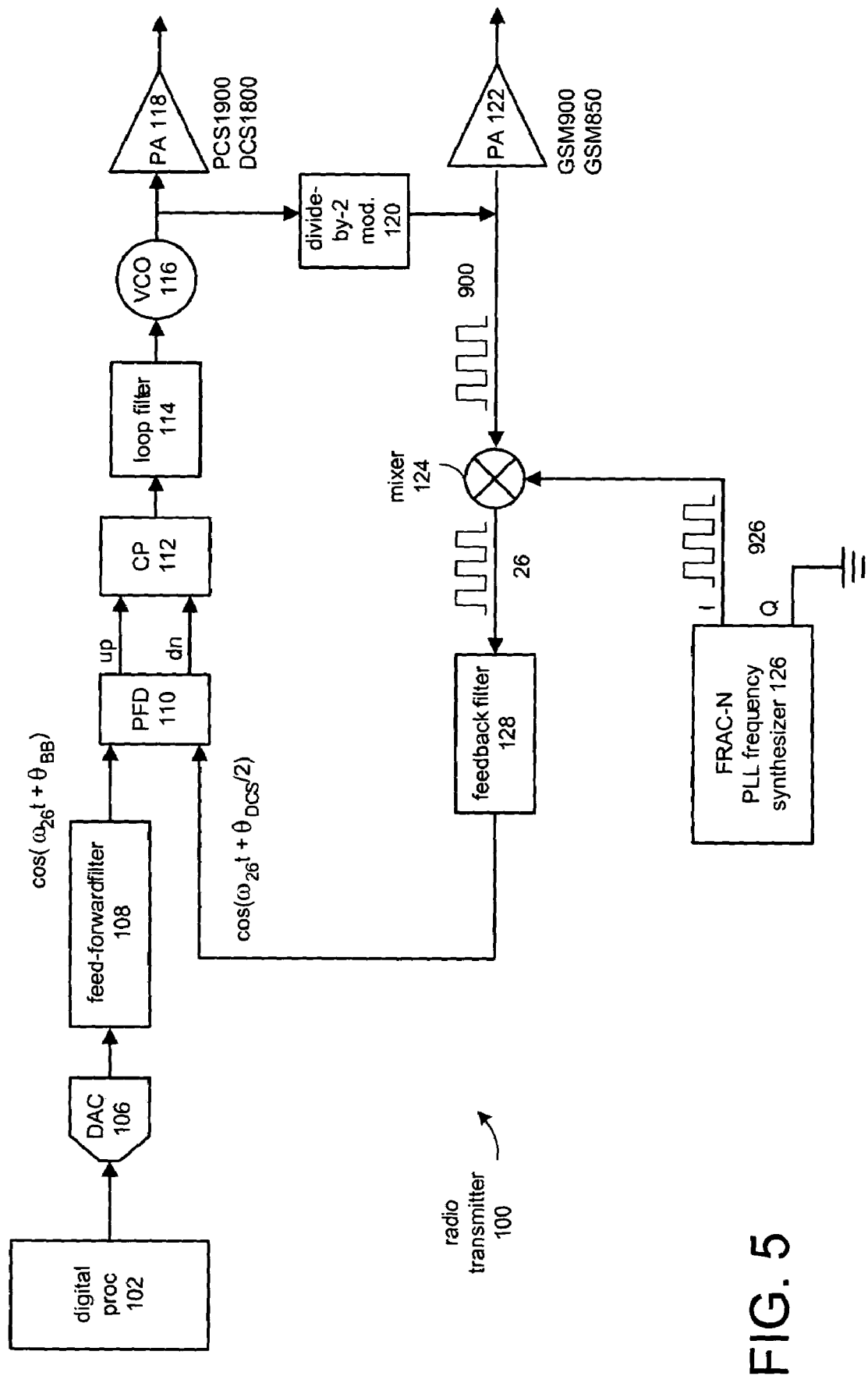
FIG. 5 is a functional block diagram of a radio transmitter formed according to one embodiment of the present invention.

FIG. 5 is a functional block diagram of a radio transmitter formed according to one embodiment of the present invention. A radio transmitter 100 includes a digital processor 102 that produces digitized intermediate frequency signals that define a phase and a frequency of a phase modulated signal. A digital-to-analog converter module 106 is coupled to receive the digitized IF signal and produces a continuous waveform IF signal to a filter 108. Filter 108 produces a filtered IF signal as a reference signal to a phase frequency detector (PFD) 110. The filtered IF signal, which may be represented as $\cos(\omega_{26} t+\theta_{BB})$, is a continuous waveform signal having a frequency of 26 MHz. In the described embodiment, the frequency of oscillation is 26 MHz, though the output frequency is a function of the digitized IF signal produced by digital processor 102. Not only is the frequency of the filtered IF signal produced by filter 108 determined by digital processor 102, but also the phase as defined by in-phase and quadrature component values. Accordingly, when radio transmitter 100 is a GSM transmitter, digital processor 102 further defines a phase of the filtered IF signal ($\theta_{BB}$) as a part of phase modulating the signal that is ultimately radiated as a radio frequency transmit signal. The PFD 110 produces control signals to a charge pump (CP) 112 that, responsive to the control signals, produces a corresponding error current signal. A loop filter 114 is coupled to receive the error current signal and to produce a corresponding error voltage signal to a voltage controlled oscillator (VCO) 116. The VCO 116 produces an oscillation, which here also is the RF transmit signal. In the described embodiment, the RF transmit signal produced by VCO 116 is produced to a power amplifier 118 for amplification and radiation from an antenna.

In the specific embodiment of FIG. 5, radio transmitter 100 is a GSM-based radio transmitter. Accordingly, the output oscillation or carrier frequency of the RF transmit signal produced by VCO 116 is equal to one of 1800 or 1900 MHz. Power amplifier 118 then receives the 1800 or 1900 MHz GSM phase modulated signal for amplification. Within the GSM domain, however, other frequencies of interest are 850 and 900 MHz. Accordingly, as may be seen, a divide-by-2 module 120 is coupled to receive the RF transmit signal produced by VCO 116 and produces one of a 900 MHz signal or an 850 MHz signal according to whether the RF transmit signal was a 1900 MHz signal or an 1800 MHz signal. The output of divide-by-2 module 120 is then received by power amplifier 122 that amplifies the signal for propagation from an antenna.

For the purposes of the present example, assume that VCO 116 produces an output frequency oscillation of 1800

MHz as the RF transmit signal. Accordingly, divide-by-2 module 120 produces a 900 MHz signal to power amplifier 122. The 900 MHz signal is further produced to a mixer 124 that is further coupled to receive a 926 MHz signal from a FRAC-N phase locked loop (PLL) frequency synthesizer 126. As is known by one of average skill in the art, mixer 124 multiplies or mixes the two input signals, here 900 MHz and 926 MHz, to produce a 26 MHz output signal. The 26 MHz output signal is produced to a feedback filter 128 that filters the 26 MHz signal to produce a 26 MHz feedback signal that may be represented as $\cos(\omega_{26} t + \theta_{DCS}/2)$. The feedback signal is produced to PFD 110 that compares the phase of the feedback signal to the filtered IF signal (the reference signal) to cause the output phase of the RF transmit signal produced by VCO 116 to track the phase of the filtered IF signal that was produced from the digitized IF signal generated by digital processor 102.

In analyzing the feedback signal produced by feedback filter 128, one may note that the frequency is 26 MHz. Additionally, the phase modulation index, represented by $\theta_{DCS}/2$, generally illustrates that the phase modulation index has been divided by 2. This phase modulation index is divided by 2 by the divide-by-2 module 120. Divide-by-2 module 120 not only divides the frequency by 2, but also the phase modulation index. Accordingly, as will be described in greater detail below, digital processor 102 selectively adjusts the phase modulation index according to whether the RF transmit signal is output before or after the divide-by-2 module 120. More specifically, if the RF transmit signal is amplified and propagated by power amplifier 118, then digital processor 102 adjusts the phase modulation index by one-half. If power amplifier 118 is turned off and the RF transmit signal is divided by 2, and the phase modulation index is divided by 2, by divide-by-2 module 120, prior to amplification and transmission from power amplifier 122, digital processor 102 does not adjust the phase modulation index.

Above it was mentioned that FRAC-N PLL frequency synthesizer 126 produces a 926 MHz signal to mixer 124. The output of mixer 124, therefore, is a 26 MHz signal. It is understood, of course, that the output frequency provided by FRAC-N PLL frequency synthesizer 126 will be a function of the output frequency provided by the divide-by-2 module 120. As is known by one of average skill in the art, a mixer, such as mixer 124, will output a frequency reflecting a difference of the two input frequencies. Accordingly, the frequency of FRAC-N PLL frequency synthesizer 126 is selected so that, when mixed with the output of divide-by-2 module 120, a desired frequency feedback signal (here, 26 MHz) is produced to feedback filter 128.

Figure 6:
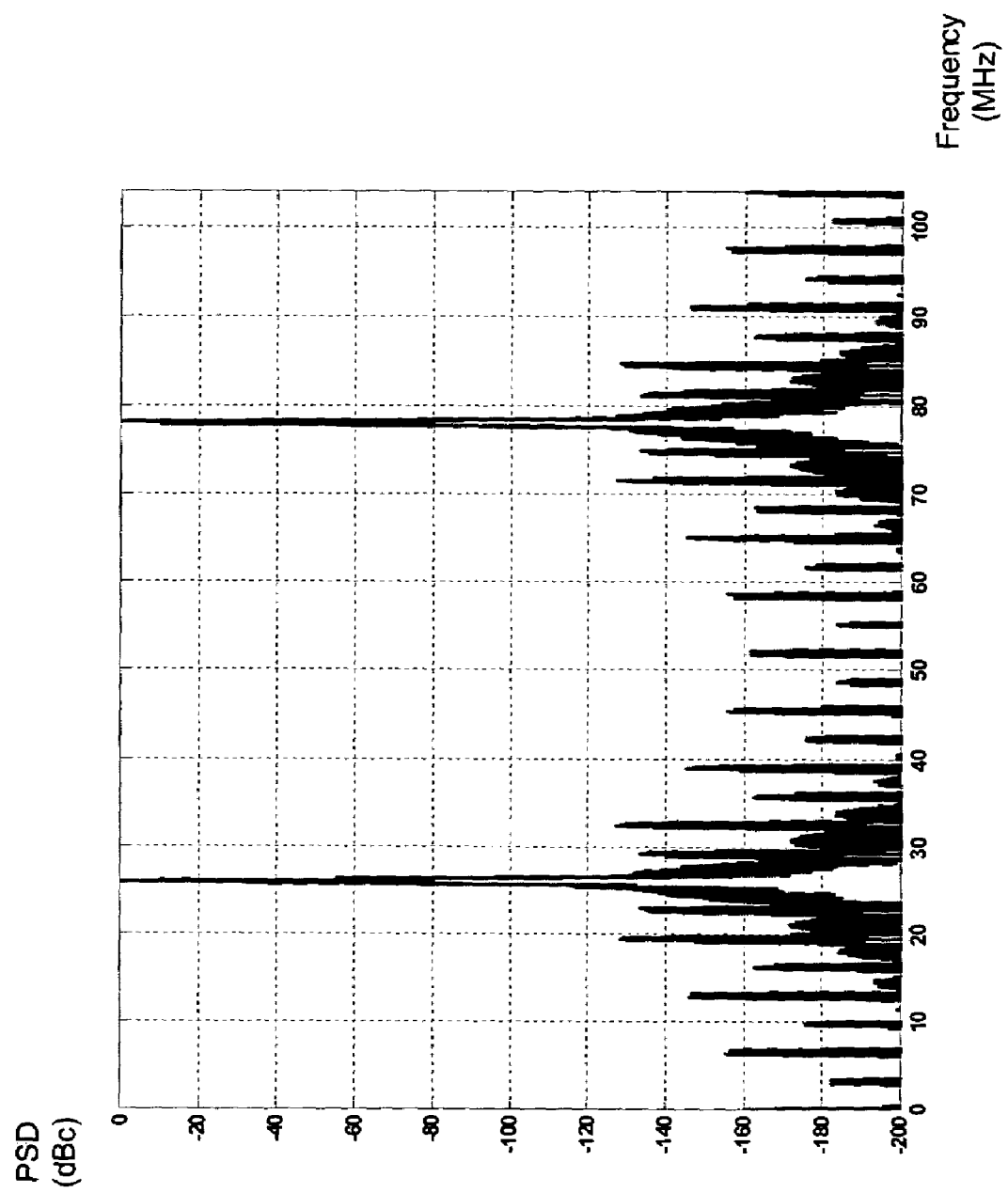
FIG. 6 is a diagram that illustrates a power spectrum density (PSD) measured in decibels relative to the carrier (dBc) versus frequency measured in Mega-Hertz of the digital output of the digital processor of FIG. 5.

FIG. 6 is a diagram that illustrates a power spectrum density (PSD) measured in decibels per centimeter (dBc) in relation to frequency measured in Mega-Hertz. As may be seen, two spikes occur at frequencies of 26 MHz and 78 MHz. The sample rate for the GSM radio transmitter of FIG. 5 is 104 MHz, while the frequency of the signals is 26 MHz. Accordingly, the diagram of FIG. 3 shows a typical output power spectrum of the digital signal generated by the inventive radio transmitter of FIG. 5. The 78 MHz spike is equal to 104 MHz less 26 MHz.

Figure 7:
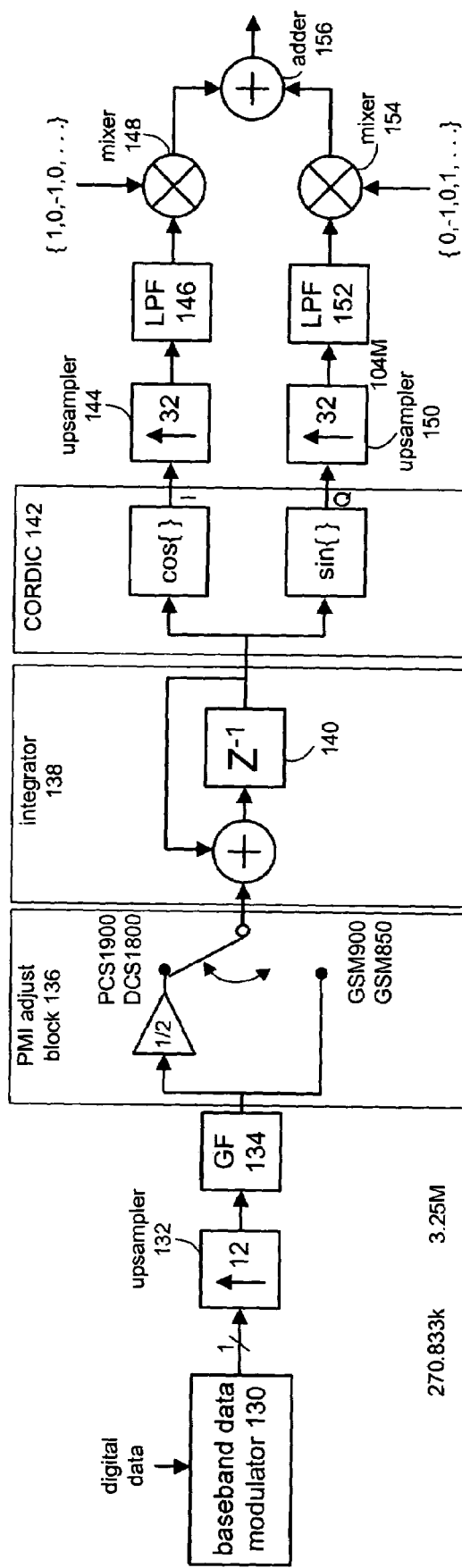
FIG. 7 is a digital processor of a radio transmitter that receives digital data, modulates the digital data and produces a digitized IF signal according to one embodiment of the present invention.

FIG. 7 is a digital processor of a radio transmitter that receives digital data, modulates the digital data and produces a digitized IF signal according to one embodiment of the present invention. A baseband data modulator 130 is coupled to receive digital data to modulate the digital data and to produce a digitized baseband signal. An upsampler (interpolator) 132 is coupled to receive the digitized baseband signal. Upsampler 132 produces an upsampled baseband signal based on the digitized baseband signal. In the described embodiment of the invention, upsampler 132 increases the sample rate of the digitized baseband signal by a factor of 12. In the described embodiment of the invention, a sample rate of the digitized baseband signal is approximately equal to 270.833 KHz.

A Gaussian filter 134 is coupled to receive the upsampled baseband signal and to produce a Gaussian filtered baseband signal. A phase modulation index adjust block 136 is coupled to receive the Gaussian filtered baseband signal. Phase modulation index adjust block 136 selectively adjusts a phase modulation index of the Gaussian filtered baseband signal by one-half according to whether an output digitized IF signal of the digital processor is eventually converted to a continuous waveform and then divided by 2.

The phase modulation index adjust block 136 comprises switching logic to selectively switch into coupling a phase modulation index divider to adjust the phase modulation index of the Gaussian filtered baseband signal. The phase modulation index adjust block 136 output is then produced to an integrator 138 which comprises a delay element 140 whose output is produced to a feedback loop to integrate the output of the phase modulation index adjust block 136. An integrated baseband signal produced by integrator 138 is then produced to a coordinate rotation digital computer (CORDIC) 142. CORDIC 142 produces I & Q vector digital data. The I vector digital data is produced to an upsampler 144 that upsamples the I vector digital data. In the described embodiment of the invention, the I vector digital data is upsampled 32 times. Upsampler 144 produces upsampled I vector (in-phase) data to a low-pass filter 146 that produces filtered I vector data. The filtered I vector data is produced to a mixer 148 that is further coupled to receive modulation data (a repeating sequence of 1, 0, −1, 0) for multiplying with successive bits of the filtered I vector (in-phase) data.

Similarly, CORDIC 142 produces Q vector (quadrature phase) digital data to an upsampler 150. Upsampler 150 upsamples the Q vector digital data by the same amount as upsampler 144. In the described embodiment, the data is upsampled by a factor of 32. Upsampler 150 produces upsampled Q vector data to a low-pass filter 152 that, in turn, produces filtered Q vector data to a mixer 154. Mixer 154 also is coupled to receive modulation data, namely (a repeating sequence of 0, −1, 0, 1) which it multiplies with successive bits of the filtered Q vector (quadrature) data. The outputs of mixers 148 and 154 are then produced to a summing block (adder) 156 that produces the digitized IF signal. The digitized IF signal, therefore, is a complex signal that readily converts to a complex IF analog signal.

It should be noted that the digitized IF signal has been upsampled, in the described embodiment, 12 times and then 32 times. Because the baseband data modulator produces data having a sample rate of 270.833 KHz, the digitized IF signal has a sample rate of 104 MHz. In one embodiment of the present invention, upsamplers 132, 144 and 150 upsample at higher rates to produce a digitized IF signal sampled at 338 MHz. Different upsampling amounts may be used, however, according to what frequencies cannot tolerate associated harmonies.

Figure 8:
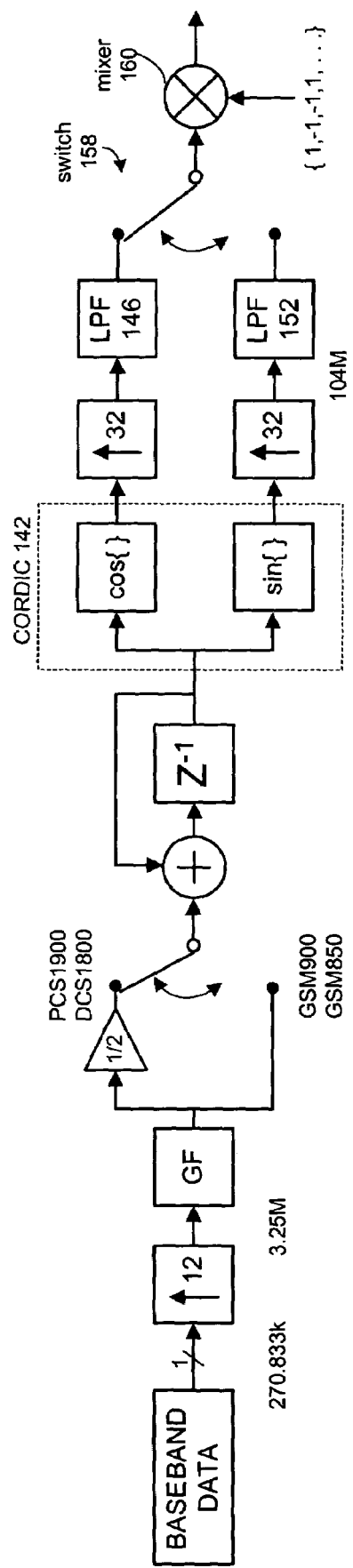
FIG. 8 is a digital processor of a radio transmitter that receives digital data, modulates the digital data and produces a digitized IF signal according to one embodiment of the present invention.

FIG. 8 is a digital processor of a radio transmitter that receives digital data, modulates the digital data and produces a digitized IF signal according to one embodiment of the present invention. As may be seen, the digital processor of FIG. 8 is similar to the digital processor of FIG. 7. One difference, however, is that only one of the I & Q vector digital data streams produced by CORDIC 142 is used to produce the digitized IF signal from an output mixer. In the diagram for the digital processor of FIG. 7, CORDIC 142 produced I & Q vector digital data streams to upsamplers 144 and 150. Here, however, a switch 158 is used to select between the I & Q vector digital data streams that are produced to an output mixer 160. Output mixer 160 then mixes, in the example shown, filtered I vector data produced by low-pass filter 146 with modulation data (a repeating sequence of 1, −1, −1, 1). The output of mixer 160 is the digitized IF signal (a complex signal) produced by the digital processor. As with the digital processor of FIG. 7, a sample rate of the digitized IF signal is 104 MHz. Alternatively, the upsamplers may be used to further increase the sample rate to, for example, 338 MHz, for application in a GSM radio transmitter.

Figure 9:
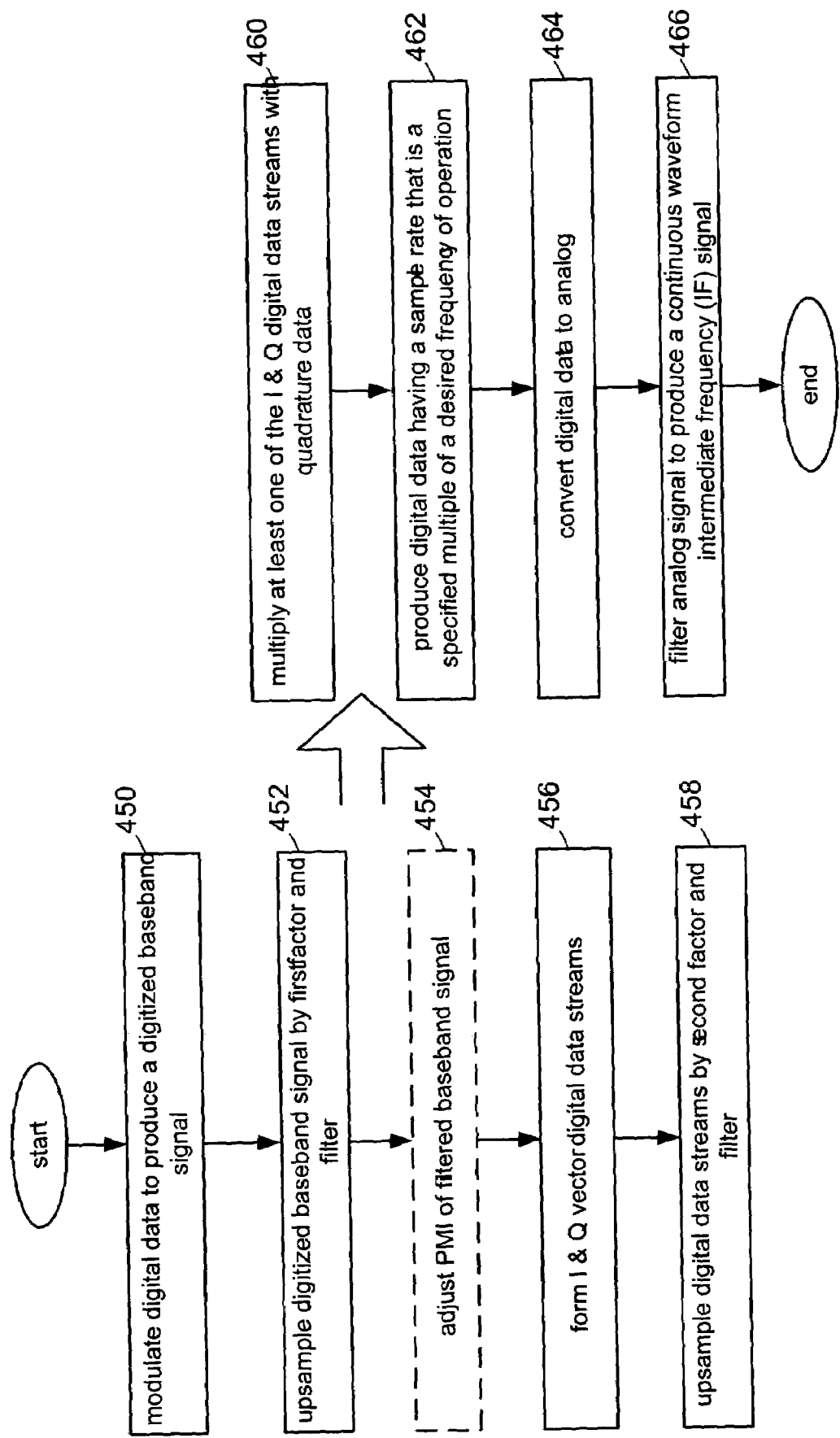
FIG. 9 is a flowchart illustrating one method of the present invention.

FIG. 9 is a flowchart illustrating one method of the present invention. A radio transmitter includes a digital processor that modulates digital data to produce a digitized baseband signal (step 450). The digitized baseband signal is then upsampled to increase the sample rate of the digitized baseband signal by a first factor and then is filtered (step 452). As has been described herein, the method further includes optionally adjusting a phase modulation index of the filtered baseband signal (step 454). Thereafter, the invention includes forming I & Q vector digital data streams (step 456). Each of the I & Q vector digital data streams are then upsampled to increase the sample rate by a second factor and then is filtered (step 458). Thereafter, at least one of the I & Q digital data streams is multiplied with modulation data to create complex digital data (step 460). Thereafter, the invention includes producing digital data having a sample rate that is a specified multiple of a desired frequency of operation (step 462). The digital data is then converted to a continuous waveform (analog) (step 464) and is filtered to produce a continuous waveform intermediate frequency (IF) signal (step 466).

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but, on the contrary, the invention is to cover all modifications, equivalents and alternatives falling within the spirit and scope of the present invention as defined by the claims. As may be seen, the described embodiments may be modified in many different ways without departing from the scope or teachings of the invention.

The invention claimed is:

1. A radio transmitter, comprising:
   a digital processor that digitally modulates digital data to produce a digitized baseband signal, that converts the digitized baseband signal to an upsampled digitized Intermediate Frequency (IF) signal by upsampling the digitized baseband signal to generate a 338 MHz sample rate, and that outputs the upsampled digitized IF signal;
   a digital-to-analog converter (DAC) coupled to receive the upsampled digitized IF signal wherein the DAC converts the digitized IF signal to a continuous waveform IF signal;
   a filter that receives and filters the continuous waveform IF signal and produces a filtered IF signal; and
   a translational loop that receives the filtered IF signal and that converts the filtered IF signal to an Radio Frequency (RF) transmit signal.

2. The radio transmitter of claim 1 wherein the translational loop comprises:
   a phase-frequency detector (PFD) coupled to receive the filtered IF signal as a reference signal and coupled to receive a feedback signal that is based upon the RF transmit signal, wherein the PFD produces a control signal reflecting a phase difference between the filtered IF signal and the feedback signal;
   a charge pump for producing an error current signal based upon and proportional to the control signal;
   a loop filter for converting the error current signal to an error voltage signal; and
   an oscillator coupled to receive the error voltage signal, the oscillator for producing the RF transmit signal corresponding to a magnitude of the error voltage signal.

3. The radio transmitter of claim 2 further including a divide by N module coupled to receive the oscillation and for dividing the oscillation by N.

4. The radio transmitter of claim 3 further including mixer and filter circuitry for down converting and filtering the oscillation to produce the feedback signal.

5. The radio transmitter of claim 1 wherein the desired frequency of operation of the filtered continuous waveform IF signal is equal to 26 MHz.

6. The radio transmitter of claim 5 having a sample rate that is a multiple of 26 MHz.

7. The radio transmitter of claim 6 wherein the multiple is greater than 2.

8. The radio transmitter of claim 1 wherein the sample rate of the digital processor generates harmonic tones that are located outside of at least one specified frequency band of interest.

9. The radio transmitter of claim 8 wherein the radio transmitter operates according to a global system for mobile communications (GSM).

10. The radio transmitter of claim 8 wherein the radio transmitter operates according to a global system for mobile communications (GSM) protocol.

11. The radio transmitter of claim 1 wherein a sample rate of the digitized IF signal is a whole multiple of a frequency of a continuous waveform IF that is used to generate an RF signal.

12. A global system for mobile communications (GSM) radio transmitter, comprising:
    digital processor for producing digital data at a 338 MHz sample rate;
    a high sample rate digital-to-analog converter (DAC) coupled to receive the digital data wherein the DAC samples the 338 MHz sample rate digital data and produces a continuous waveform IF signal;
    a filter for producing a filtered continuous waveform IF signal based upon the continuous waveform IF signal wherein the filtered continuous waveform IF signal oscillates at an IF frequency; and
    a translational loop for producing an oscillation to a power amplifier for amplifying the oscillation prior to propagation and for producing a feedback signal based upon the oscillation to a phase-frequency detector (PFD) of the translational loop, wherein the PFD compares the continuous waveform IF signal to the feedback signal as a part of producing the oscillation.

13. The radio transmitter of claim 12 wherein the IF frequency is equal to 26 MHz.

14. The radio transmitter of claim 13 wherein the sample rate of the digital processor and the sample rate of the DAC generate harmonic tones that are located outside of at least one specified frequency band of interest.

15. The radio transmitter of claim 13 wherein a phase modulation index of the digital data is adjusted by ½ according to whether the output oscillation and phase modulation index produced by the translational loop are divided by two prior to being amplified and propagated.

16. The radio transmitter of claim 13 wherein a phase modulation index of the digital data is adjusted whenever the output oscillation is not divided by two prior to being amplified and propagated.

17. The radio transmitter of claim 16 wherein the output oscillation is selectively amplified and propagated as an 1800 MHz carrier signal.

18. The radio transmitter of claim 17 wherein the output oscillation is selectively amplified and propagated as a 1900 MHz carrier signal.

19. The radio transmitter of claim 17 wherein the phase modulation index of the digital data is not adjusted whenever the output oscillation is divided by two prior to being amplified and propagated.

20. The radio transmitter of claim 19 wherein the output oscillation is selectively amplified and propagated as a 900 MHz carrier signal.

21. The radio transmitter of claim 19 wherein the output oscillation is selectively amplified and propagated as a 950 MHz carrier signal.

22. A radio transmitter, comprising:
a digital processor that digitally modulates digital data to produce a digitized baseband signal, that converts the digitized baseband signal to an upsampled digitized Intermediate Frequency (IF) signal by upsampling the digitized baseband signal by a factor of at least 384 times for which a sample rate of the digitized IF signal is a whole multiple of a frequency of a continuous waveform IF that is used to generate an RF signal, and wherein the digital processor outputs the digitized IF signal;
a digital-to-analog converter (DAC) coupled to receive the digitized IF signal wherein the DAC converts the digitized IF signal to a continuous waveform IF signal;
a filter that receives and filters the continuous waveform IF signal and produces a filtered IF signal; and
a translational loop that receives the filtered IF signal and that converts the filtered IF signal to an Radio Frequency (RF) transmit signal.

23. The radio transmitter of claim 22 wherein the desired frequency of operation of the filtered continuous waveform IF signal is equal to 26 MHz.

24. The radio transmitter of claim 23 having a sample rate that is a multiple of 26 MHz.

* * * * *